(12) United States Patent
Tomoda et al.

(10) Patent No.: US 10,025,675 B2
(45) Date of Patent: Jul. 17, 2018

(54) LOG MANAGEMENT METHOD AND COMPUTER SYSTEM

(71) Applicant: Hitachi, Ltd., Tokyo (JP)

(72) Inventors: Atsushi Tomoda, Tokyo (JP); Yuuya Isoda, Tokyo (JP); Kazutomo Ushijima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/313,137

(22) PCT Filed: Jan. 20, 2015

(86) PCT No.: PCT/JP2015/051343
§ 371 (c)(1),
(2) Date: Nov. 22, 2016

(87) PCT Pub. No.: WO2016/117022
PCT Pub. Date: Jul. 28, 2016

(65) Prior Publication Data
US 2017/0206147 A1 Jul. 20, 2017

(51) Int. Cl.
*G06F 7/00* (2006.01)
*G06F 11/14* (2006.01)
*G06F 17/30* (2006.01)

(52) U.S. Cl.
CPC ...... *G06F 11/1471* (2013.01); *G06F 11/1469* (2013.01); *G06F 17/30091* (2013.01); *G06F 17/30371* (2013.01); *G06F 2201/84* (2013.01)

(58) Field of Classification Search
CPC ........ G06F 3/061; G06F 3/0643; G06F 3/067; G06F 11/0727

USPC ................................. 707/640, 648, 672, 982
See application file for complete search history.

(56) References Cited

U.S. PATENT DOCUMENTS

| | | | | |
|---|---|---|---|---|
| 5,966,706 A | * | 10/1999 | Biliris | G06F 17/30368 |
| 6,173,292 B1 | * | 1/2001 | Barber | G06F 11/1471 707/682 |
| 2006/0218205 A1 | * | 9/2006 | Shimizu | G06F 11/1471 |
| 2007/0106707 A1 | * | 5/2007 | Yamato | G06F 12/0246 |

(Continued)

FOREIGN PATENT DOCUMENTS

| JP | 07-248949 A | 9/1995 |
|---|---|---|
| JP | 2006-268531 A | 10/2006 |

OTHER PUBLICATIONS

Vo et al., LogBase: A Scalable Log-structured Database System in the Cloud, The 38th International Conference on Very Large Data Bases, Aug. 27-31, 2012, Istanbul, Turkey, Proceedings of the VLDB Endowment, vol. 5, No. 10, pp. 1004-1015.*

(Continued)

*Primary Examiner* — Cheyne D Ly
(74) *Attorney, Agent, or Firm* — Mattingly & Malur, PC

(57) ABSTRACT

Provided is a log management method in which, with a computer system provided with a processor, a memory, and a storage device, the processor executes a prescribed process and stores in the storage device a log which includes a description of the process, said method comprising a first step of the processor generating the log which includes the description of the prescribed process, a second step of the processor writing the log to a log file of the storage device, and a third step of the processor determining the end of the log region which stores the log and writing same to the log file of the storage device.

8 Claims, 9 Drawing Sheets

(56) References Cited

U.S. PATENT DOCUMENTS

| | | |
|---|---|---|
| 2009/0070343 A1 | 3/2009 | Shimizu et al. |
| 2014/0095458 A1* | 4/2014 | Kim .................... G06F 17/3033 707/698 |
| 2014/0208083 A1* | 7/2014 | Burnett .................... G06F 9/38 712/228 |

OTHER PUBLICATIONS

O'Neil et al., The log-structured merge-tree (LSM-tree), Acta Informatica, 33, pp. 351-385, 1996.*
Jim Gray, "Transaction Processing", 1st edition, Nikkei Business Publications, Inc., Oct. 29, 2001, pp. 593-616.
International Search Report of PCT/JP2015/051343 dated Mar. 10, 2015.

* cited by examiner

LOG MANAGEMENT METHOD AND COMPUTER SYSTEM

BACKGROUND

This invention relates to improvement of the concurrent processing capability in log output for the purpose of ensuring durability of transactions in a management system of a relational database.

Development of devices has propelled increase in the number of cores integrated in a CPU mounted on a server and the capacity of a memory. As a result, in-memory databases are prevailing that deploy major data such as tables and indices of the relational database onto the memory.

For restoration of such an in-memory database at occurrence of a system failure, records of changes need to be outputted as logs to a storage device such as a hard disk or a flash memory.

In a conventional computer system expected to use a hard disk drive as a persistent device to record the logs, responding to a single I/O output take a high proportion of the processing time of a server that performs transaction processing. For this reason, instead of performing a log I/O output at each transaction, the server once stores a log to a log buffer area allocated in a memory and a log manager thread collectively outputs logs in the log buffer area to the persistent device sequentially and in time series. The persistent device is a non-volatile storage device for holding data persistently.

To efficiently share one log file among multiple transactions, US 2014/0208083 A discloses a technique that divides the log file into a plurality of slots having a common size; reserves, by a log manager, the slots for a plurality of threads in turn; and writes logs to the slots.

SUMMARY

The advancement of semiconductor manufacturing technology has increased the number of cores mountable on a server, so that transactions nowadays are processed by multiple threads in parallel. Accordingly, the waiting for completion of the log outputs handled by the above-mentioned log manager has become a bottleneck.

In the meanwhile, for the competition among the resources caused by I/O processing in the multiple threads, a technique based on the specifications called NVM (Non-Volatile Memory) Express has been established that provides independent I/O queues to individual threads and performs I/O processing independently on each thread.

This technique enabled each thread to perform an I/O output without competing against the other threads. However, using the resources, such as I/O queues, allocated separately to the individual threads may generate the following problems.

The first problem is generation of a toothless area in the log device or the storage device for storing the log. When each of the threads performing transaction processing outputs an I/O to its own reserved area in the log device using the independently assigned I/O queue, the order of completion of processing the I/Os independently issued by the threads is not always guaranteed.

If a failure occurs in a server at some time, only the logs of the threads that have completed I/O processing are made persistent and the area to be written by the thread that has not completed I/O processing remains in the state before being written (blank), although logs should be stored continuously in the log device. Hereinafter, the blank area that is not written is referred to as toothless area.

The second problem is increase in processing time of failure recovery. In the case where the log manager in the related art collectively outputs logs, the log manager arranges the logs of multiple transactions to be recorded to consecutive addresses and then writes the logs in a single I/O output. Accordingly, the above-mentioned toothless area is not generated; the area starting from the area that does not store a log and appears first after a log is an unwritten area.

However, in the case where multiple threads independently write logs, a toothless area may be generated as described above. Accordingly, in the failure recovery processing based on the logs to restore the database to the state before the occurrence of the failure, even if an area not including a log (toothless area) is found in scanning the log device, another log may be stored in the following not-scanned area. Therefore, the entirety of the log device needs to be scanned after a toothless area is found, so that the recovery may take excessively long time.

This invention has been accomplished in view of the foregoing problems and an object of this invention is to expedite, in a computer system configured to write a plurality of logs to a storage device, retrieval of the logs in recovery processing.

A representative aspect of the present disclosure is as follows. A log management method for a computer system including a processor, a memory, and a storage apparatus, the processor being configured to execute specified processing and store a log including details on the processing to the storage apparatus, the log management method comprising a first step of generating, by the processor, a log including details on the specified processing a second step of writing, by the processor, the log to a log file in the storage apparatus; and a third step of determining, by the processor, an end of a log area for storing logs and writing, by the processor, the end of the log area to the log file in the storage apparatus.

According to this invention, the end of the log area is written to the log file, so that the range of area of the storage device to be scanned can be determined in recovery processing such as failure recovery. Therefore, the scanning time on the storage device is reduced and as a result, the failure recovery time in the computer system is reduced.

DETAILED DESCRIPTION OF THE EMBODIMENTS

Hereinafter, embodiments of this invention will be described using the accompanying drawings.

Embodiment 1

Hereinafter, an embodiment will be described with reference to the drawings.

The following description includes reference signs including the same parent number for the same kind of components. To distinguish the same kind of components, reference signs (in alphabets, for example) for identifying individual components may be used: for example, a thread 110A, a thread 110B, and the like. On the contrary, not to distinguish the same kind of components, only the parent number of the reference signs may be used: for example, threads 110 or a thread 110.

In the following description, "program" may be used as the subject of a sentence for explaining processing. Since a program is executed by a processor to perform predetermined processing using storage resources (such as a main memory 416) and/or a communication interface device as necessary, the subject of the processing may be the processor. Processing described with a subject of program may be regarded as processing performed by the processor or the apparatus (such as a database server) including the processor. The processor may include a hardware circuit for performing part or all of the processing. The program can be installed from a program source to the controllers. The program source can be a program distribution computer or storage media.

Figure 1:
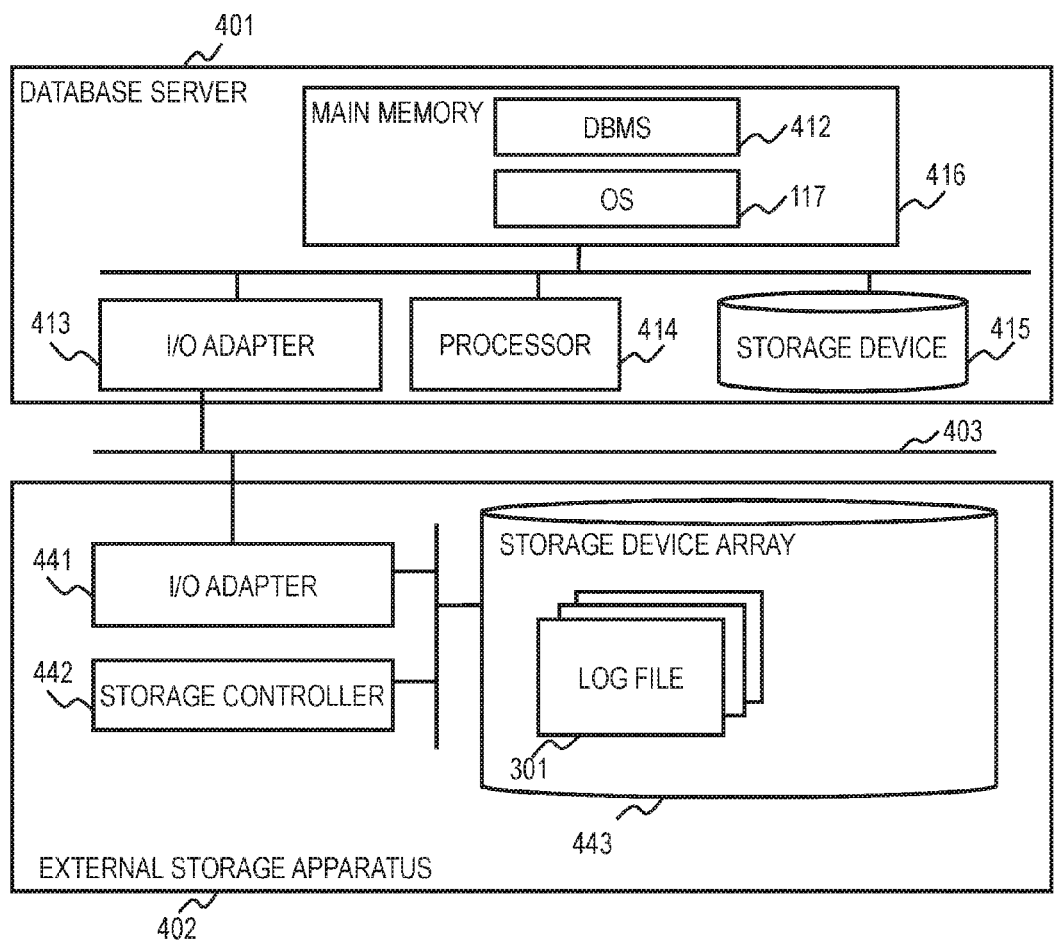
FIG. 1 is a block diagram for illustrating an example of the configuration of a computer system according to a first embodiment of this invention.

FIG. 1 is a block diagram for illustrating an example of the configuration of a computer system of this invention. A database server 401 is coupled with an external storage device 402 via a communication network 403, for example.

The database server 401 is a computer, which may be one of a personal computer, a work station, and a mainframe, or a virtual computer configured with a virtualization program in one of these computers.

The database server 401 includes an I/O adapter 413, a main memory 416, a storage device 415, and a processor 414 coupled with these. The processor 414 may be a multi-core microprocessor or a module including a microprocessor and a dedicated hardware circuit. The processor 414 executes computer programs loaded to the main memory 416. The computer programs to be executed by the processor 414 include an operating system (OS) 117 and a database management system (hereinafter, DBMS) 412.

The main memory 416 may be a volatile DRAM (Dynamic Random Access Memory) and temporarily stores programs to be executed by the processor 414 and the data to be used by the programs. A non-volatile semiconductor memory may be employed as the main memory 416.

The storage device 415 includes a non-volatile storage medium and may be an HDD (Hard Disk Drive) or an SSD (Solid State Drive). The storage device 415 can store programs or data to be used by the programs. The I/O adapter 413 couples the database server 401 to the communication network 403.

The external storage apparatus 402 is an apparatus including a storage device array 443 comprised of a plurality of storage devices and may be a disk array apparatus. The external storage apparatus 402 may be a single storage device, instead of the plurality of storage devices.

The external storage apparatus 402 stores a log file 301 holding a plurality of logs. The external storage apparatus 402 receives a log I/O request from the database server 401. The external storage apparatus 402 reads or writes data (for example, a log) in accordance with the I/O request and responds the result of the read or write to the database server 401. The storage devices in the storage device array 443 are devices including a non-volatile storage medium and may be HDDs or SSDs. The storage device array 443 may be configured with RAID (Redundant Array of Independent Disks) groups to store data at a specific RAID level. Logical storage devices (such as logical units, logical volumes, or file system volumes) based on the storage space of the storage device array 443 may be provided to the database server 401 and the log file 301 may be stored in one of the logical storage devices. In this embodiment, the log file 301 is an example of a log storage area for storing logs.

In addition to the storage device array 443, the external storage apparatus 402 includes an I/O adapter 441 and further, a storage controller 442 coupled with these. The I/O adapter 441 couples the external storage apparatus 402 to the communication network 403 and couples the external storage apparatus 402 to the data base server 401 via the communication network 403. The communication network 403 may employ a communication protocol such as Fibre Channel (FC), SCSI (Small Computer System Interface), or TCP/IP (Transmission Control Protocol/Internet Protocol). In the case of Fibre Channel or SCSI, the I/O adapter 441 (and also the I/O adapter 413) can be called host bus adapter.

The storage controller 442 includes a memory and a processor, and reads data from or writes data to the storage device array 443 holding the log file 301 in accordance with an I/O request from the database server 401.

Figure 2:
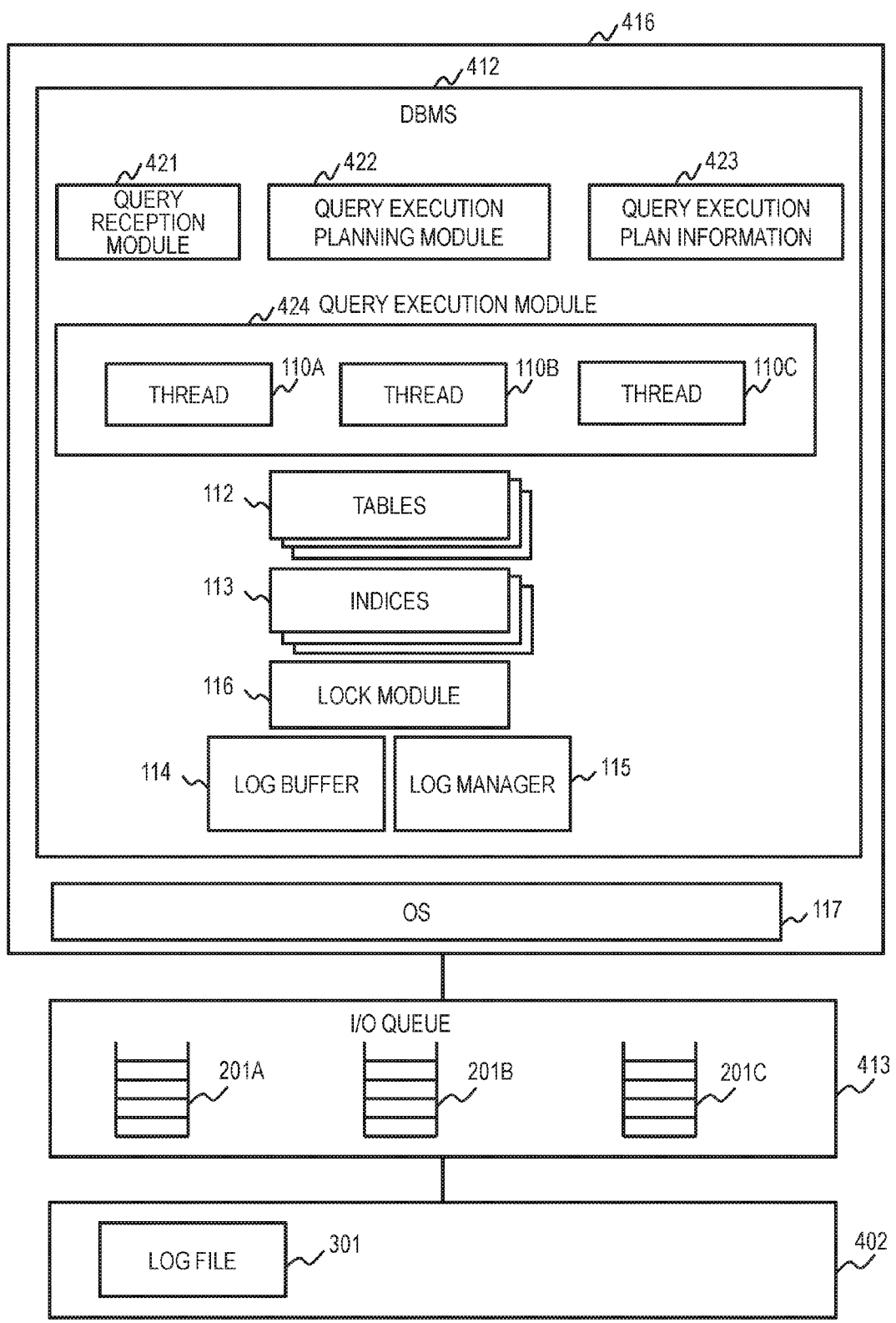
FIG. 2 is a functional block diagram of the database server according to the first embodiment of this invention.

FIG. 2 is a functional block diagram of the database server 401 in the embodiment.

The DBMS 412 in Embodiment 1 may be an in-memory database. The DBMS 412 deploys the tables 112 and the indices 113 to the main memory 416.

Furthermore, the DBMS 412 may include a lock module 116. The lock module 116 is used to prevent two or more of the threads 110A to 110C from competing with each other. The lock module 116 is a module for locking the tables 112 and the indices 113. The lock module 116 can include information for indicating whether a lock has been acquired. For example, the information indicates a value "1" if a lock has been acquired and a value "0" if a lock has not been acquired.

The DBMS 412 includes a log buffer 114 and a log manager 115. The log buffer 114 temporarily stores logs each including an update record for a table 112 or an index 113. The log manager 15 manages the log file 301 and writing logs to the log file 301. The log manager 115 can include a recovery processing module 125 that retrieves the log file 301 and backup data and applies logs to the backup data to restore the tables 112.

The DBMS 412 receives a query from a query issuer and performs one or more transactions to execute the received query. Specifically, the DBMS 412 includes a query reception module 421, a query execution planning module 422, and a query execution module 424.

The query reception module 421 receives a query issued by a query issuer. The query may be described in Structured Query Language (SQL). Multiple transactions may be described in one query or in a plurality of queries.

The query issuer may be an internal computer program inside the DBMS 412 or an external computer program outside the DBMS 412. For example, the external computer program may be a computer program (such as an application program) running on the database server 401 or a computer program (such as an application program) running on an apparatus such as a client computer coupled with the database server 401.

The query execution planning module 422 generates a query execution plan including one or more database operations required to execute a query from the query received by the query reception module 421.

The query execution plan is information including, for example, one or more database operations and relations of execution order between database operations and stored as query execution plan information 423. The query execution plan information 423 may be expressed in a tree structure in which each database operation is represented by a node and each relation of execution order between database operations is represented by an edge.

The query execution module 424 executes a query received by the query reception module 421 in accordance with the query execution plan generated by the query execution planning module 422 and responds the execution result of the query to the query issuer.

In these operations, the query execution module 424 issues a read request (reference request) for the data required to execute a database operation and retrieves the data from the tables 112 in accordance with the read request. Using the retrieved data, the query execution module 424 executes the database operation in accordance with the query to calculate data and issues a write request to update the data of the source record with the calculated data.

The query execution module 424 executes database operations by executing one or more threads 110A to 110C. The DBMS 412 executes multiple threads 110A to 110C in parallel. For this purpose, the processor 414 has multiple cores. The multiple cores are included in one or more CPUs. Each thread 110 can be referred to as task. The thread 110 may be implemented with a process or a kernel thread provided by the OS 117 or a user thread provided by a library. One thread 110 may execute one transaction corresponding to one or more database operations. Hereinafter, a thread 110 may be used as the subject of processing performed by the query execution module 424 executing the thread 110.

The query execution module 424 (a thread 110) executes a transaction and generates a log including a result (or details) of processing the transaction. Each thread 110 in the query execution module 424 issues an I/O request for the external storage apparatus 402 in order to write a log to the log file 301 in the external storage apparatus 402 and sends the I/O request to the OS 117. The OS 117 receives the I/O request and forwards the I/O request to the external storage apparatus 402.

The I/O adapter 413 is provided with multiple I/O queues 201 (201A to 201C). In processing a transaction, a thread 110 issues an I/O request to write a log to the external storage apparatus 402. The I/O request is stored to an I/O queue 201. Specifically, the I/O request is stored to the I/O queue 201 by the OS 117.

The external storage apparatus 402 stores a log file 301. The log to be written included in the I/O request is recorded to the log file 301.

In Embodiment 1, the threads 110 of the query execution module correspond to the I/O queues 201 one to one. That is to say, each of the threads 110A to 110C is provided with one of the I/O queues 201A to 201C. Specifically, the thread 110A is associated with the I/O queue 201A. For example, the thread 110A is configured to issue a log I/O request indicating that a record of a table 112 is updated to the log file 301. The issued I/O request is sent to the OS 117 via the log buffer 114. Upon receipt of the I/O request to the log file 301, the OS 117 stores the I/O request to the I/O queue 201A associated with the thread 110A. The I/O request stored in the I/O queue 201A is sent by the OS 117 from the I/O queue 201A to the external storage apparatus 402. The external storage apparatus 402 writes the log or the data to be written included in the I/O request to the log file 301.

The configuration of the DBMS 412 shown in FIG. 2 is merely an example. For example, some component may be divided into a plurality of components or a plurality of components may be integrated into a single component.

Figure 3:
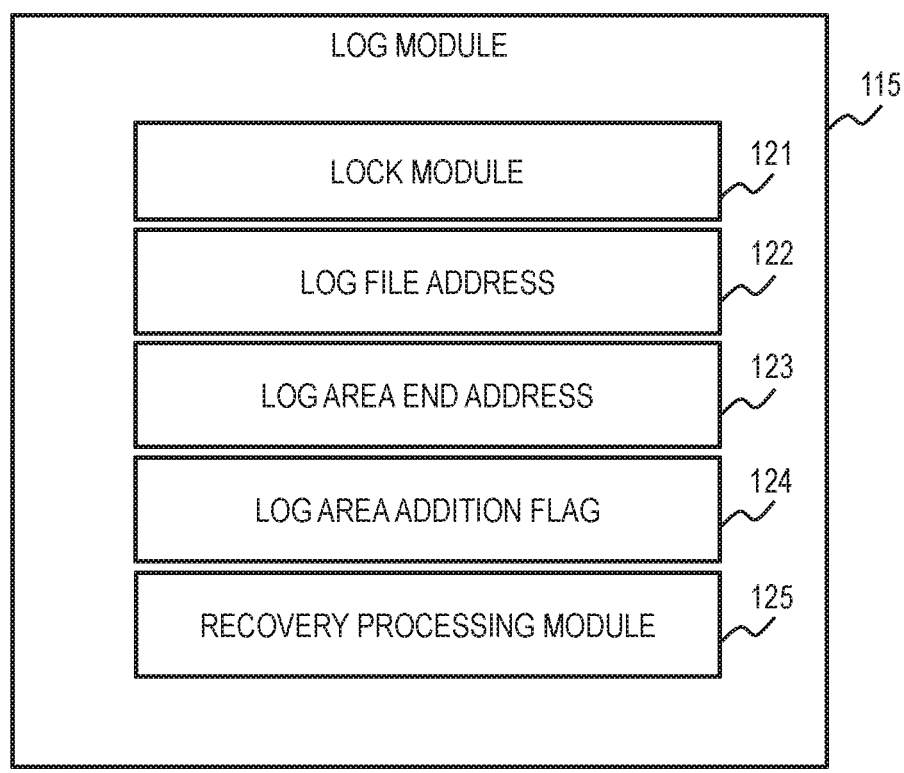
FIG. 3 is a block diagram for illustrating an example of the configuration of the log manager according to the first embodiment of this invention.

FIG. 3 is a block diagram for illustrating an example of the configuration of the log manager 115. The log manager 115 includes a lock module 121, a log file address 122, a log area end address 123, a log area addition flag 124, and a recovery processing module 125.

The lock module 121 can be data for indicating whether a lock for the log manager 115 has been acquired, like the lock module 116 shown in FIG. 2. For example, the lock module 121 indicates a value "1" if a lock has been acquired and a value "0" if a lock has not been acquired. To write or read the log file address 122, the log area end address 123, or the log area addition flag 124, a lock of the lock module 121 must be acquired.

The log file address 122 is an address in the log file 301 where a log is written. The address (value) indicated by the log file address 122 is added by the size of the output log each time a log is written to the log file 301. The log file address 122 and the later-described log area end address 123 are values for indicating the end of the storage area of the logs in the external storage apparatus 402 and can be LBAs (Logical Block Addresses).

The log area end address 123 is the upper limit value for the log file address 122; no log can be written to the area at a value higher than this upper limit value. In recovery processing, the upper limit for the range of the log file to be scanned in the recovery processing is set to the log area end address 123. The area beyond the log area end address 123 is not scanned in the recovery processing.

The log area addition flag 124 is set when a thread processing a transaction is adding an area to the area where to output logs. For example, this flag indicates a value "1" when such addition is being processed and a value "0" when such addition is not being processed.

The recovery processing module 125 executes recovery processing for restoring the tables 112 by applying the logs in the log file 301. The recovery processing module 125 starts processing upon receipt of a specific command from a not-shown management apparatus.

Figure 4:
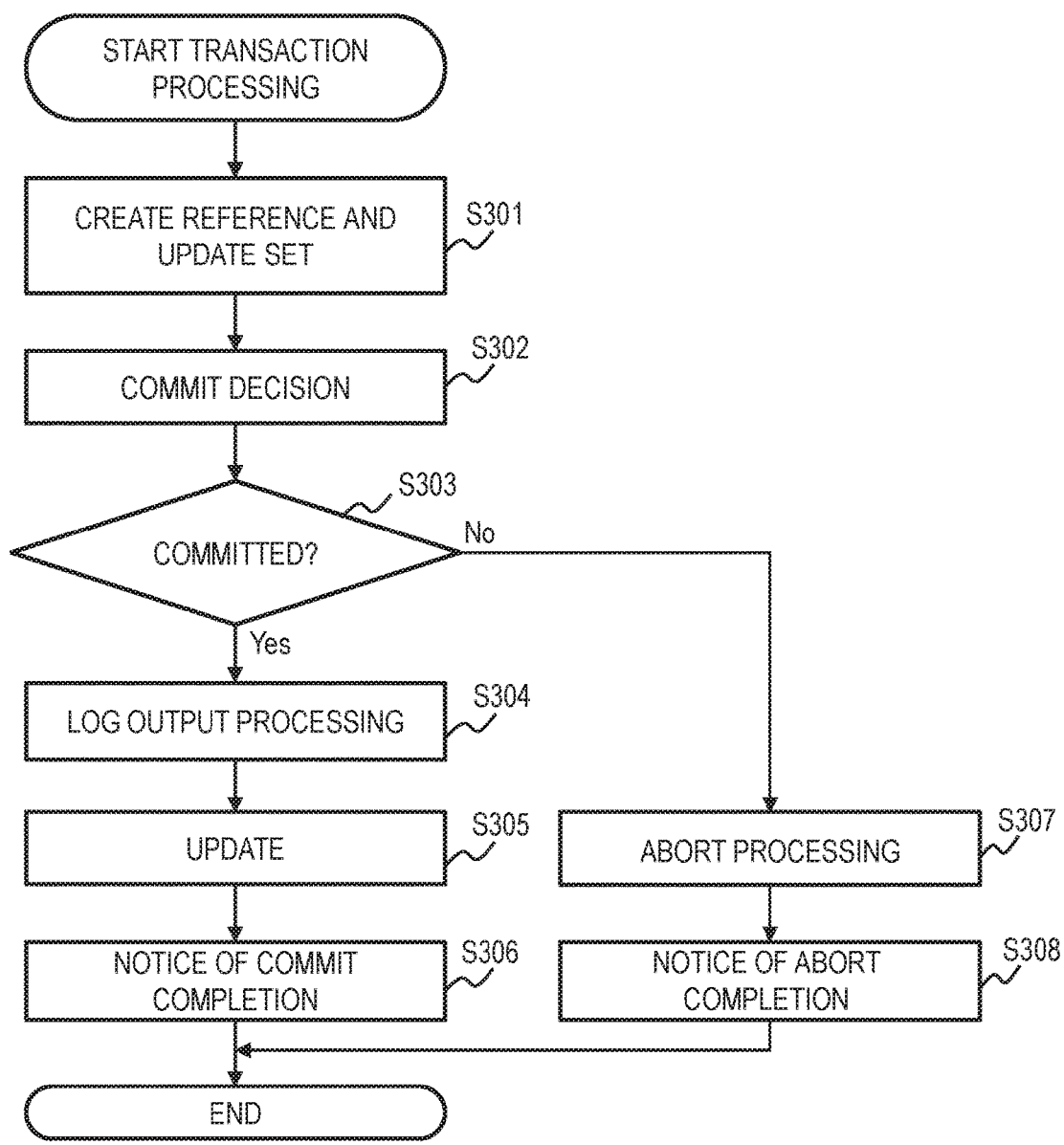
FIG. 4 is a flowchart of transaction processing according to the first embodiment of this invention.

FIG. 4 is a flowchart of transaction processing. The following description is about one transaction as an example. Upon start of a transaction A, a thread 110A generates a reference and update set based on an instruction (an instruction in a query) corresponding to the transaction A (S301).

The reference and update set is a set of reference of a record (read request for a table 112) and update of the record (write requests for the table 112 and an index 113). Although the reference and update set is a request set to update the table 112 and the index 113, no change is made in the table 112 and the index 113 at Step S301 but the reference and update set is held in the local memory area (a not-shown area allocated in the main memory 461) for the transaction A.

Next, the thread 110A makes commit decision (S302). The commit decision is made depending on the isolation level of the database (or the transaction isolation level) to determine whether the changes of the table 112 and the index 113 to be made in the transaction A based on the reference and update set are consistent to the other transactions.

If the commit decision is "not OK" (because of processing error, for example) (S303: No), the thread 110A performs abort processing (S307), outputs a notice of abort completion, and closes the transaction.

If the commit decision is "OK" (because of completion of processing, for example) (S303: Yes), the thread 110A performs log output processing (S304). The log output processing is, as will be described later, to write a log including the details of the processing to the log file 301 each time the specified processing (transaction) is completed.

Next, the thread 110A updates the table 112 and the index 113 based on the reference and update set (S305), issues a notice of commit completion (S306), and closes the transaction.

Through the above-described processing, the thread A outputs a notice of commit completion if the transaction processing is successful and outputs a notice of abort completion if the transaction processing is failed.

Figure 5:
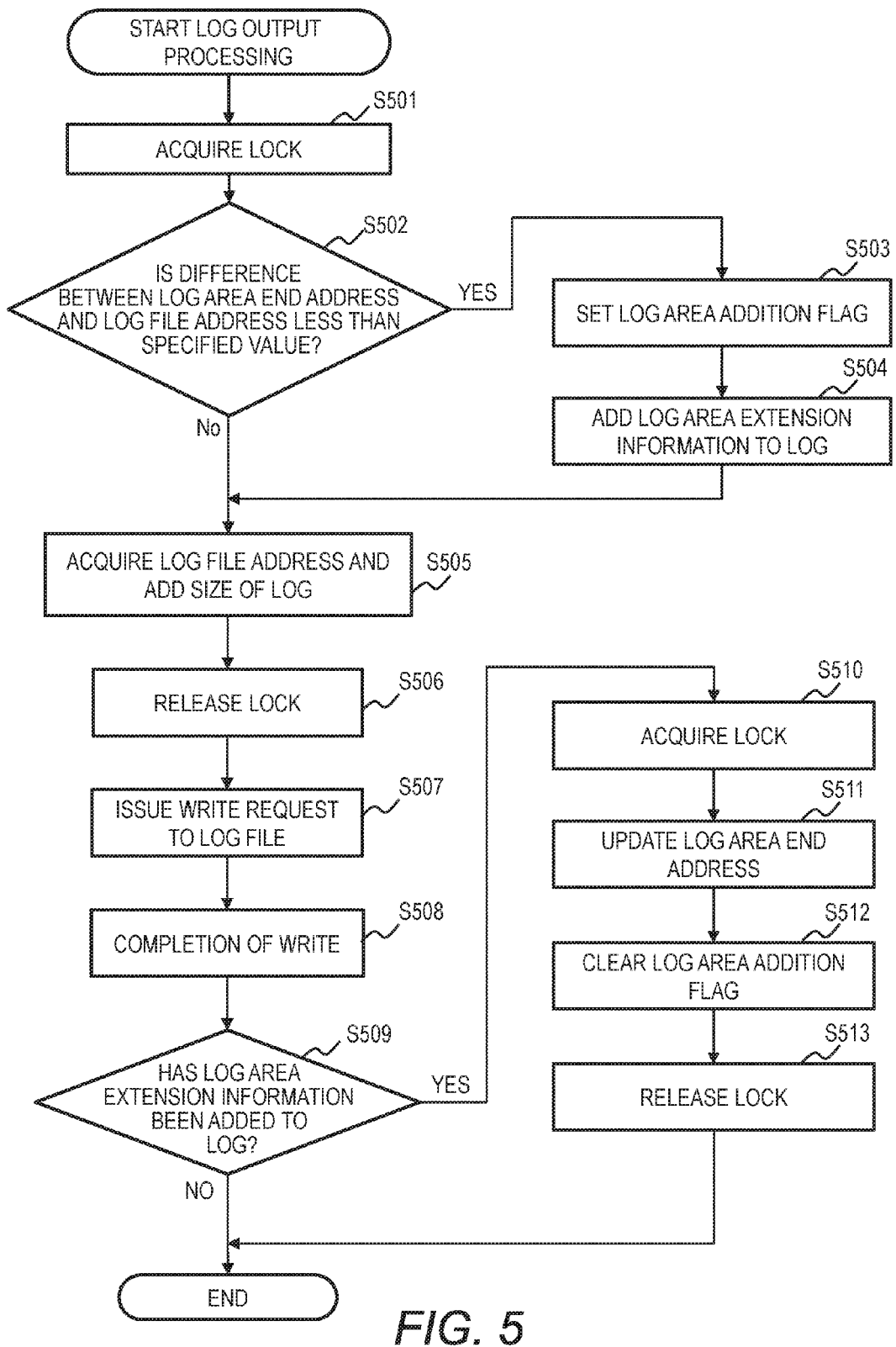
FIG. 5 is a flowchart of an example of the log output processing according to the first embodiment of this invention.

FIG. 5 is a flowchart of an example of the log output processing (S304 in FIG. 4). First, the thread 110A executing the transaction acquires the lock module 121 of the log manager 115 (S501).

Next, the thread 110A determines whether the difference between the log area end address 123 and the log file address 122 is less than a specified value and further, determines whether the log area addition flag 124 is unset (S502). This specified value is a size of log area enough to be used in the time required to update the log area end address 123, and is predetermined and held by the DBMS 412.

If both of the determination results at Step S502 are YES, the thread 110A prepares to extend the log area. Specifically, the thread 110A sets the log area addition flag 124 (S503) and adds a log area extension log (or log area extension information) to the log of the current transaction generated in the log buffer 114 (S504).

If the determination results at Step S502 are NO, the thread 110A acquires the log file address 122, adds the size of the log generated in the log buffer 114 (or the log to be written) to the log file address (S505), and releases the lock module 121 of the log manager 115 (S506).

The thread 110A issues a write request of the log prepared in the log buffer 114 (a write request designating the log file address 122 acquired from the log manager 115) (S507). The thread 110A completes the write processing upon receipt of a notice of write completion from the external storage apparatus 402 through the I/O adapter 413 (S508).

Through the above-described processing, the thread 110A writes a new log to the log file 301 and updates the log file address 122 of the log file 301.

Upon completion of the write, the thread 110A determines whether a log area extension log has been added to the log of the current transaction (S509). This log area extension log is information added at Step S504.

If the determination result at Step S509 is YES, the thread 110A extends the log area. First, the thread 110A acquires the lock module 121 from the log manager 115 (S510).

Next, the thread 110A adds a value corresponding to the log area extension information added to the log file 301 at the foregoing Step S504 to the log area end address 123 and sets the obtained value to the log area end address 123 (S511). That is to say, the thread 110A extends the log area by adding the predetermined size to the end address of the log area.

The thread 110A updates the log area end address 123 of the log file 301. The thread 110A further clears the log area addition flag 124 (S513). Through the foregoing Steps S509 to S513, the log area of the log file 301 is extended.

If the determination result at Step S509 is NO, the thread 110A terminates the log output processing without further processing.

The above-described processing enables the thread 110A to extend the log area if the log area might become short in writing the log to the log file 301.

Figure 6:
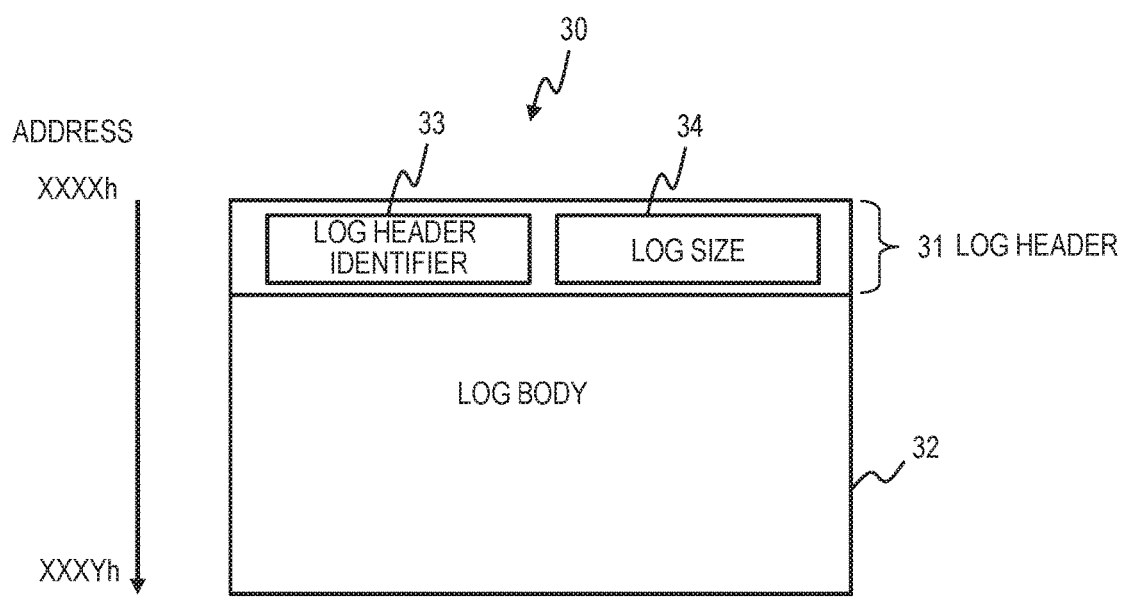
FIG. 6 is a diagram for illustrating an example of the data structure of a log according to the first embodiment of this invention.

FIG. 6 is a diagram for illustrating an example of the data structure of a log. At least one log 30 is generated for one transaction.

Each log 30 to be stored in the log file 301 comprises a log header 31 and a log body 32. The log header 31 includes a log header identifier 33 and a log size 34. The log body 32 stores a record of a change to the database and a log area extension log. The log size 34 is a value for indicating the size of the log 30 if the log 30 is a variable-length record.

The log header identifier 33 is stored in the beginning of the log header 31; verifying its value by a specific method enables determination that the log 30 correctly begins from the address. In the example of the simplest implementation where the log header identifier 33 stores the value of the start address of the log header 31 (or a hash value of the address), it can be determined that a valid log header 31 begins from the address. To prevent an accidentally recorded bit string from erroneously being determined to be correct, a longer bit length, for example, including the address and the hash value together, may be used in the determination.

The recovery processing module 125 retrieves a log header identifier 33 from a log header 31 and verifies it to determine that the log 30 is valid.

The log file 301 is a file storing a plurality of logs 30 shown in the drawing. The log file 301 stores a log file address 122 and a log area end address 123 in addition to the logs 30. The log file address 122 and the log area end address 123 are stored in a specific area (for example, the beginning) of the log file 301.

Figure 7:
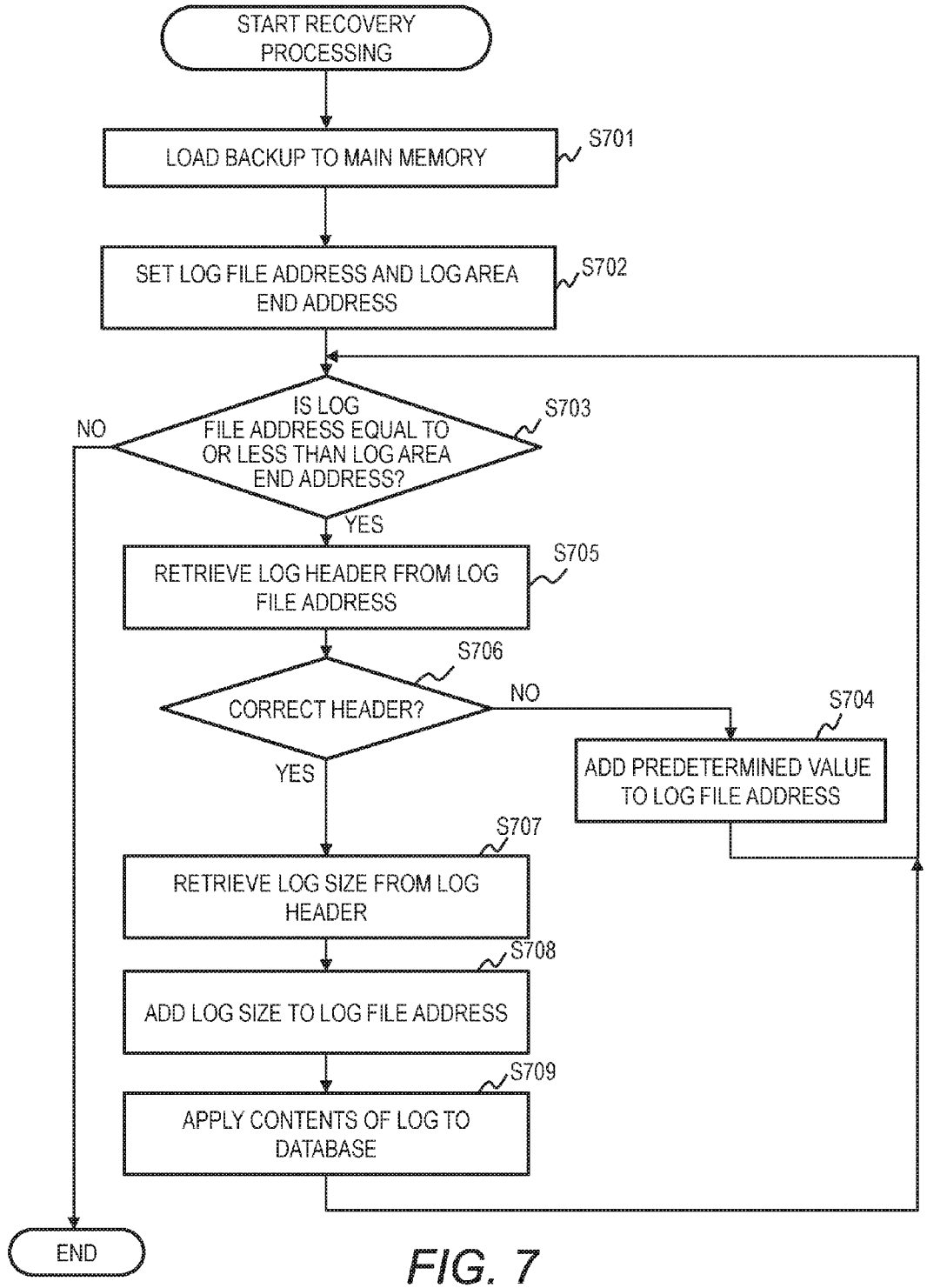
FIG. 7 is a flowchart of recovery processing according to the first embodiment of this invention.

FIG. 7 is a flowchart of recovery processing. The recovery processing restores the latest database (tables 112) from the database (tables 112) as of the moment when the DBMS 412 has backed up the database to the external storage apparatus 402 and the logs 30 in which differences have been recorded successively since the generation of the backup.

In Embodiment 1, the DBMS 412 backs up the database to the external storage apparatus 402 each time a predetermined trigger event occurs. The DBMS 412 also generates a log 30 and writes the log 30 to the log file 301 each time an update, an addition, or a deletion is made to the tables 112. Upon receipt of a specific command, the DBMS 412 starts recovery processing with the recovery processing module 125. The predetermined trigger event can be elapse of a predetermined time or an update of the tables 112.

The recovery processing module 125 first loads the backup database (tables 112) in the external storage apparatus 402 to the main memory 416 (S701). Next, the recovery processing module 125 sets the log area end address 123 recorded in the log file 301 to a specific area of the log manager 115 (S702). The recovery processing module 125 sets the address to start the recovery, such as the start address of the log file 301, to the log file address 122. The address to start the recovery may be set by the administrator of the database server 401; the administrator can designate the address of the log 30 as of the time of generation of the backup data.

Next, the recovery processing module 125 determines whether the log file address 122 of the log file 301 is equal to or less than the log area end address 123 (S703).

If the determination result at Step S703 is NO, all the logs 30 to be applied have already been applied to the database; accordingly, the recovery processing module 125 terminates the recovery processing.

If the determination result at Step S703 is YES, the recovery processing module 125 retrieves the log header 31 from the address indicated in the log file address 122 (S705) and determines whether the log header identifier 33 is correct (S706).

In the determination whether the log header identifier 33 is correct, the recovery processing module 125 can determine that the log header 31 is correctly recorded if the start address of the log header 31 matches the value of the log header identifier 33, as described above. In this Embodiment 1, if the log header 31 is correct, the recovery processing module 125 determines that the log body 32 has also been recorded correctly.

If the determination result at Step S706 is that the log header identifier 33 is not correct (NO), the recovery processing module 125 adds a predetermined value to the log file address 122, returns to Step S703, and repeats the foregoing processing.

The predetermined value to be added to the log file address 122 here can be the size of a log 30. For example, if the log sizes are always fixed to a multiple of 32 bytes, the recovery processing module 125 adds 32 bytes to the log file address 122. This is because, when a correct log is missing, the recovery processing module 125 has to search for the next valid log 30; the recovery processing module 125 scans the addresses that could be the start address of the next log 30.

Figure 8:
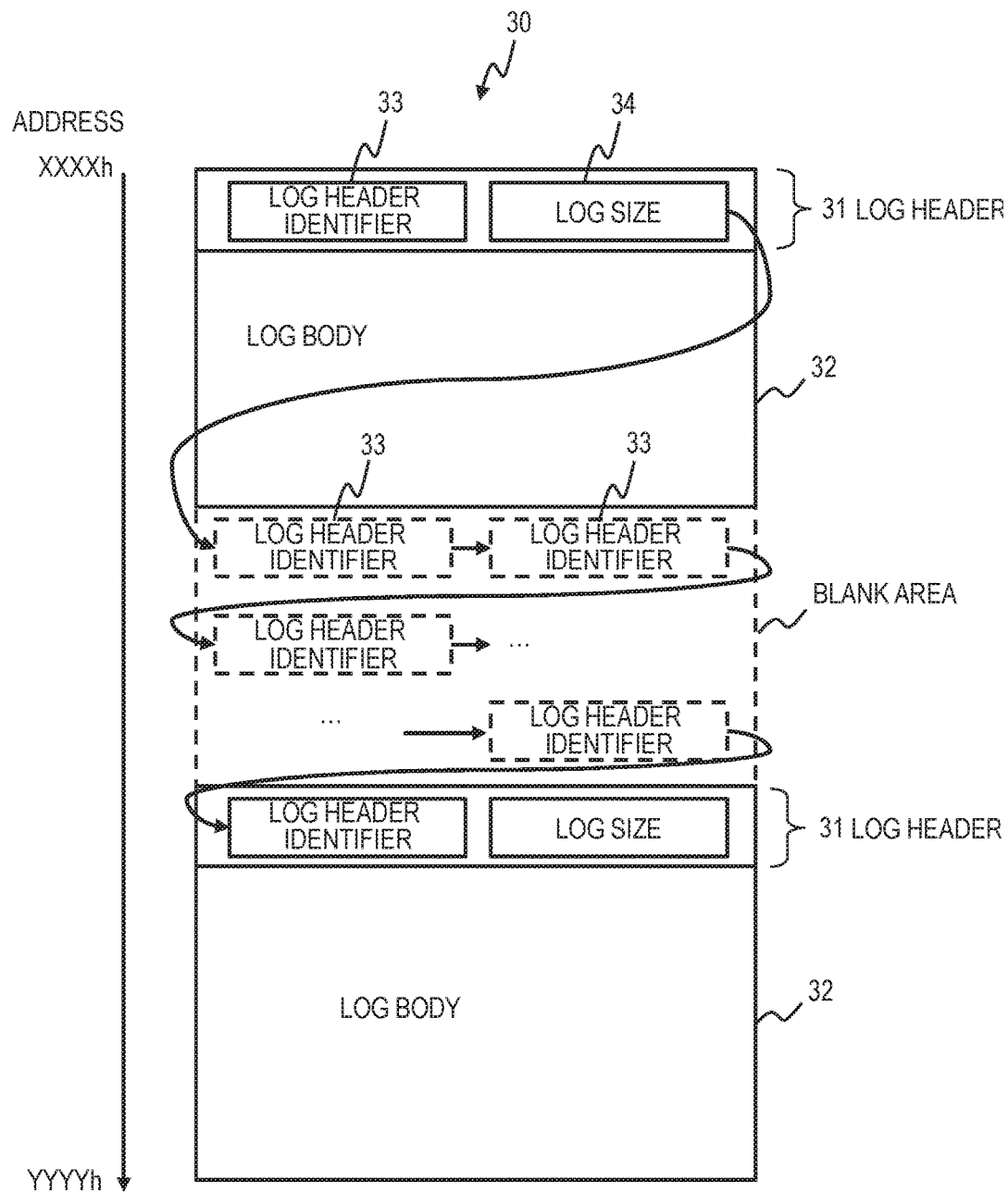
FIG. 8 is a diagram for illustrating an example of searching for a log header next to a blank area, in the case where the log bodies have different lengths according to the first embodiment of this invention.

If the sizes of the logs 30 are different, the predetermined number to be added to the log file address 122 can be the size of the log header identifier 33. The log header identifier 33 is specified in a fixed length and described in 4 bytes, for example. In this case, as illustrated in FIG. 8, the recovery processing module 125 sequentially adds the size of the log header identifier 33 to the log file address 122, so that the recovery processing module 125 can detect the next log header identifier 33 (log header 31) even if a blank area exists. FIG. 8 is a diagram for illustrating an example of searching for a log header 31 next to a blank area, in the case where the log bodies 32 have different lengths.

If the determination result at Step S706 is that the log header identifier 33 is correct (YES), the recovery processing module 125 retrieves the log size 34 stored in the log header 31 (S707) and adds the retrieved log size 34 to the log file address 122 (S708). Further, the recovery processing module 125 retrieves the log body 32 up to the obtained log file address 122, applies the contents of the log body 32 to the backup data to restore the database (tables 112) (S709). Thereafter, the recovery processing module 125 sets the log file address 122 to the next log 30, returns to Step S703, and repeats the above-described processing until the log area end address 123.

Through the foregoing processing, the recovery processing module 125 can acquire the next log 30 by searching the log file 301 in units of log header 31 even if the log file 301 includes a toothless area (blank area) among the logs 30.

In Embodiment 1, the threads 110A to 110C of the DBMS 412 running on the database server 401 store logs to their respective I/O queues 201A to 201C in parallel and subsequently, store the logs to the log file 301 in the external storage apparatus 402 through the I/O adapter 413 and the network 403. Each of the threads 110A to 110C can write a log 30 to its own log area even if an area at a smaller address (for the previous log 30) than the address the thread is going to write has not been written.

As a result, the waiting time of the log manager thread mentioned in the background section for completion of writing logs of a series of transactions is reduced. Accordingly, the processor processing time per transaction is reduced and the overall processing performance of the computer system improves.

The threads 110 of the DBMS 412 record the range (log area end address 123) of the area in the log file 301 to be scanned in failure recovery to the log file 301 for storing logs 30 in the external storage apparatus 402.

This configuration reduces the time taken to scan the log file 301 in recovery processing and expedites the failure recovery. Each thread 110 increases the log area end address 123 by a predetermined amount to allocate a new log area when the difference between the log area end address 123 and the log file address 122 becomes less than a predetermined value. That is to say, the log area is gradually extended with addition of a log 30, which keeps a minimum scan range in recovery processing.

Since the area of the log file 301 gradually increases with addition of a log 30, the blank area(s) to be searched in recovery processing can be kept small, achieving failure recovery in a shorter time.

In the case where the logs 30 are variable-length records, a log header identifier 33 having a fixed length is set to each log 30. If a failure in the database server 401 generates blank area(s) where one or more threads 110 have not completed writing a log 30, the recovery processing module 125 can detect the next valid log header identifier 33 by increasing the log file address 122 in units of the size of the log header identifier 33.

Although the above-described Embodiment 1 provides an example where the I/O queues 201 for individual threads 110 are provided in the I/O adapter 413 of the database server 401, the configuration is not limited to this. The I/O queues 201A to 201C can be provided in the external storage apparatus 402. In this case, the I/O queues 201A to 201C are provided in the I/O adapter 441.

Although the above-described Embodiment 1 provides an example where each thread 110 increases the log area by changing the log area end address 123 when predetermined conditions are satisfied, the configuration is not limited to this. For example, each time a thread 110 writes a log 30, the thread 110 may add the size of the written log 30 to the log area end address 123 to update the log file 301.

That is to say, each thread 110 may determine the end of the log area at each time of writing a log to the log area and perform the log output or determine the end of the log area when the log area needs to be extended and perform log output.

Embodiment 2

Figure 9:
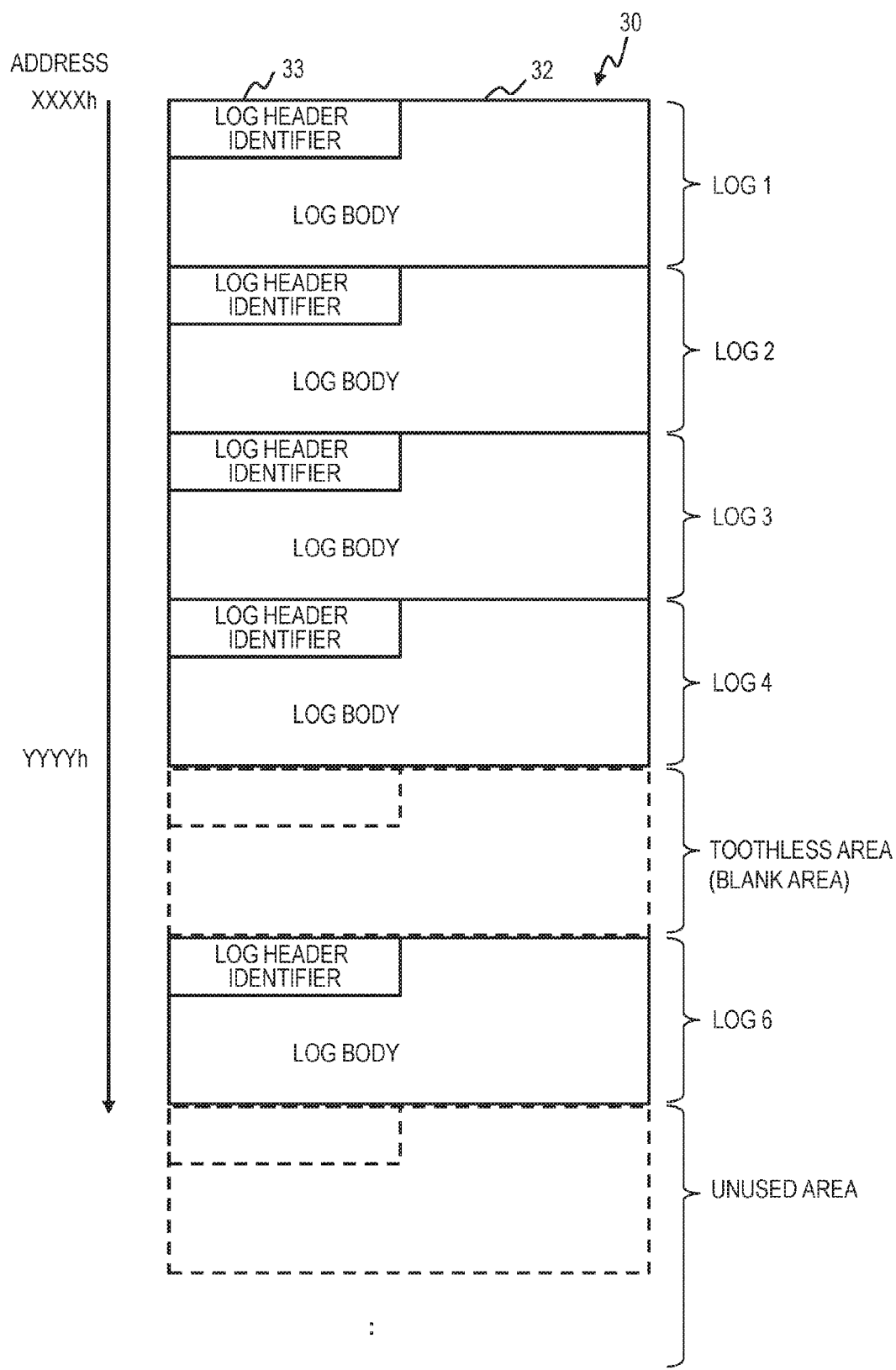
FIG. 9 is a diagram for illustrating a second embodiment and depicts an example of the structure of a log of a fixed-length record according to a second embodiment of this invention.

FIG. 9 is a diagram for illustrating a second embodiment and depicts an example of the structure of a log 30 of a fixed-length record. In Embodiment 2, the sizes of the logs 30 in the above-described Embodiment 1 are a fixed length and the other configuration is the same as the configuration in Embodiment 1.

A log 30 of a fixed-length record comprises the same log header identifier 33 and the same log body 32 as those of the log 30 in Embodiment 1.

In recovery processing, upon completion of retrieval and application of a log 30, the recovery processing module 125 adds a predetermined value to the log file address 122 to calculate the start address of the next log 30. The recovery processing module 125 retrieves the log header identifier 33 of the next log area to determine whether the log header identifier 33 is valid.

If the log header identifier 33 is not valid, the recovery processing module 125 adds the predetermined value to the log file address 122 to calculate the start address of the next log 30 and returns the processing result to the log area end address 123.

Fixing the sizes of the logs 30 expedites the searching for a valid log 30 in recovery processing, compared to the case of the logs 30 having different sizes. In the case of the different sizes of logs, searching a blank area for a log header identifier 33 is necessary as illustrated in FIG. 8. In the case of the fixed sizes of logs, however, the recovery processing module 125 that has retrieved Log 4 in FIG. 9, in which the log area next to Log 4 is a blank area, can retrieve the next log header identifier 33 from the start address of Log 6 obtained by adding a predetermined value to the current log file address 122.

As understood from the above, Embodiment 2 employs fixed-length logs 30 to perform recovery processing in units of log area even if a blank area is included and achieve reduction in time for failure recovery.

Conclusion

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A log management method for a computer system comprising a processor, a memory, and a storage apparatus, the method comprising:
   executing, by the processor, an input or an output (I/O) process of data stored by the computer system;
   generating, by the processor, a log including details of the I/O process;
   writing, by the processor, the log to a log file in the storage apparatus, wherein the log file includes a plurality of logs at respective log addresses and each log includes a log header identifier and a size of the log;
   determining, by the processor, a log area end address indicating an upper limit address for storing a log in the log file;
   generating, by the processor, backup data of the data and storing, by the processor, the backup data to the storage apparatus;
   executing, by the processor, recovery by retrieving the backup data;
   determining, by the processor, a recovery log area end address;
   determining, by the processor, an address to begin recovery within the log file;
   continuously determining if the address to begin recovery is equal to or less than the recover log area end address and upon determining the address to begin recovery is equal to or less than the recover log area end address:
      determine whether a log header identifier of the log at the address to begin recovery is correct based on the value of the log header identifier and a start address of the log header;
      upon determining the log header identifier is correct, acquire a size of the log and add it to the address to begin recovery, and apply the contents of the log to the backup data; and
      upon determining the log header identifier is not correct, add a predetermined value to the address to begin recovery.

2. The log management method according to claim 1, further comprising a step of setting an identifier for indicating whether the log is valid.

3. The log management method according to claim 1, wherein
   a predetermined size is added to the address of the end of the log area of a log file in a case where a difference between the address of the end of the log area and the log file address is smaller than a predetermined value.

4. The log management method according to claim 1, wherein the log is a variable length.

5. The log management method according to claim 1, wherein the log is fixed length equal to the predetermined value.

6. The log management method according to claim 1,
   wherein the processor is configured to run a plurality of threads and each of the plurality of threads is assigned an I/O queue, and
   wherein the log is written by a thread from an I/O queue.

7. A computer system comprising:
   a processor;
   a memory; and
   a storage apparatus coupled to the processor,
   wherein the memory stores instructions that when executed by the processor cause the processor to:
   execute an input or an output (I/O) process of data stored by the computer system,
   generate a log including details of the I/O process;

write the log to a log file in the storage apparatus, wherein the log file includes a plurality of logs at respective log addresses and each log includes a log header identifier and a size of the log;

determine a log area end address indicating an upper limit address for storing a log in the log file;

generate backup data of the data and storing, by the processor, the backup data to the storage apparatus;

execute recovery by retrieving the backup data;

determine a recovery log area end address;

determine an address to begin recovery within the log file;

continuously determine if the address to begin recovery is equal to or less than the recover log area end address and upon determining the address to begin recovery is equal to or less than the recover log area end address:
  determine whether a log header identifier of the log at the address to begin recovery is correct based on the value of the log header identifier and a start address of the log header;
  upon determining the log header identifier is correct, acquire a size of the log and add it to the address to begin recovery, and apply the contents of the log to the backup data; and upon determining the log header identifier is not correct, add a predetermined value to the address to begin recovery.

8. The computer system according to claim 7, wherein an identifier for indicating whether the log is valid is set to the log.

* * * * *